United States Patent
Zhou (10) Patent No.: US 12,114,400 B2
(45) Date of Patent: Oct. 8, 2024

(54) HEATING CONTROL CIRCUIT AND ELECTRIC BLANKET CONFIGURED WITH HEATING CONTROL CIRCUIT

(71) Applicant: Ningbo OWFine Home Textiles Design Co., Ltd., Zhejiang (CN)

(72) Inventor: Min Zhou, Ningbo (CN)

(73) Assignee: North Star Home LLC, Libertyville, IL (US)

( * ) Notice: Subject to any disclaimer, the term of this patent is extended or adjusted under 35 U.S.C. 154(b) by 608 days.

(21) Appl. No.: 17/494,115

(22) Filed: Oct. 5, 2021

(65) Prior Publication Data

US 2023/0036804 A1 Feb. 2, 2023

(51) Int. Cl.
*H05B 1/02* (2006.01)
*A47G 9/02* (2006.01)
*G05D 23/24* (2006.01)

(52) U.S. Cl.
CPC ......... *H05B 1/0272* (2013.01); *A47G 9/0215* (2013.01); *G05D 23/24* (2013.01)

(58) Field of Classification Search
CPC . H05B 3/342; H05B 3/36; H05B 1/02; H05B 1/0202; H05B 1/0255; H05B 1/0272; H05B 2203/02; A47G 9/0215; G05D 23/1909; G05D 23/24; G05D 23/2401
See application file for complete search history.

(56) References Cited

U.S. PATENT DOCUMENTS

| 4,546,238 A * | 10/1985 | Ahs ...................... B60H 1/2218 |
| | | 219/508 |
| 2015/0230289 A1* | 8/2015 | Corona ............... B32B 38/1858 |
| | | 219/494 |

FOREIGN PATENT DOCUMENTS

| CN | 200953658 Y | * | 9/2007 | |
| CN | 101098571 A | * | 1/2008 | ............. G05D 23/20 |
| CN | 101303607 B | * | 4/2011 | |
| CN | 209573378 U | * | 11/2019 | |
| JP | 06104070 A | * | 4/1994 | |
| KR | 20070076032 A | * | 7/2007 | |
| WO | WO-2007086625 A1 | * | 8/2007 | ............... H05B 3/56 |

\* cited by examiner

*Primary Examiner* — Hung D Nguyen
(74) *Attorney, Agent, or Firm* — Prospect Law LLP (57) ABSTRACT

A heating control circuit configured to control power of an electric heating element, comprises a temperature sensing element, having positive temperature coefficient ("PTC") characteristics and configured to sense a temperature of the electric heating element to generate a temperature voltage, a first comparison circuit, configured to compare the temperature voltage with a reference voltage to generate a comparison signal, a controller, configured to output an on-off control signal according to the comparison signal; and a first switching element, coupled into a ground loop of the electric heating element and configured to switch on or off a power loop of the electric heating element based on the on-off control signal.

20 Claims, 6 Drawing Sheets

HEATING CONTROL CIRCUIT AND ELECTRIC BLANKET CONFIGURED WITH HEATING CONTROL CIRCUIT

TECHNICAL FIELD

The present invention relates to the technical field of circuit control, in particular to a heating control circuit and an electric blanket configured with the heating control circuit.

BACKGROUND ART

An electric blanket is a common household appliance mainly used to increase the temperature in bed when people sleep to achieve the purpose of warming. The electric blanket has the advantages of low power consumption, adjustable temperature, convenience in use and wide application, and has a history of more than 100 years.

At the beginning, the quality of the electric blanket was not good. The electric blanket sometimes caused a fire or electric shock, resulting in casualties and property losses. With the improvement of technology, the quality of the electric blanket has improved. However, if the electric blanket is not well maintained after being used for a long time, an electrical leakage or fire may still occur, which will threaten lives of users. Such a similar situation occurs usually because the temperature control of the electric heating wire is inaccurate, or because the aging of key components such as the electric heating wire or switching element leads to a short circuit, which makes the local temperature of the electric blanket too high. At this time, if the power supply is not cut off in time, it is easy to cause a fire.

The present invention strives to solve these problems.

SUMMARY OF THE INVENTION

An objective of the present invention is to provide a heating control circuit to improve safety of electric blankets and similar electric heating devices. The heating control circuit can accurately control a heating temperature, meanwhile can detect a working state of key elements, and can prevent a local temperature of an electric heating wire from being too high and causing a fire, thereby ensuring the life and property safety of users.

In order to achieve the above objective, the present invention adopts the following technical solutions:

One aspect of the present invention discloses a heating control circuit configured to control power of an electric heating element, including: a temperature sensing element, having positive temperature coefficient ("PTC") characteristics and configured to sense a temperature of the electric heating element to generate a temperature voltage; a first comparison circuit, configured to compare the temperature voltage with a reference voltage to generate a comparison signal; a controller, configured to output an on-off control signal according to the comparison signal; and a first switching element, coupled into a ground loop of the electric heating element and configured to switch on or off a power loop of the electric heating element based on the on-off control signal.

In some embodiments, the first comparison circuit at least includes a first comparator. A forward input terminal of the first comparator is coupled to a power terminal of the temperature sensing element via a voltage divider circuit, a reverse input terminal of the first comparator is configured to receive the reference voltage, and an output terminal of the first comparator is coupled to one signal input terminal of the controller.

In some embodiments, the heating control circuit of the present invention further includes a reference voltage setting circuit. The reference voltage setting circuit is coupled to at least one signal output terminal of the controller and the reverse input terminal of the first comparator, and configured to adjust the reference voltage received by the first comparison circuit based on a setting signal of the controller.

In some embodiments, the heating control circuit of the present invention further includes a level adjusting circuit. The level adjusting circuit is coupled to one signal input terminal of the controller and configured to generate a level adjusting signal, and the controller is further configured to output the setting signal based on the level adjusting signal to adjust the reference voltage received by the first comparison circuit.

In some embodiments, the heating control circuit of the present invention further includes a display circuit. The display circuit is coupled to at least one signal output terminal of the controller, and configured to display a current setting level or a fault signal based on a display control signal output by the controller.

In some embodiments, the heating control circuit of the present invention further includes a fuse protection circuit. The fuse protection circuit includes a heating circuit, a second switching element, and a thermal fuse coupled into the power loop of the electric heating element. The heating circuit is configured to generate heat when the second switching element is turned on so as to blow out the thermal fuse.

In some embodiments, the heating circuit includes two thermistors connected in parallel. One end of the two thermistors is coupled to a current output terminal of the thermal fuse, and the other end of the two thermistors is grounded via the second switching element. The thermal fuse is installed between the two thermistors.

In some embodiments, the heating control circuit of the present invention further includes a short-circuit detection circuit. The short-circuit detection circuit is coupled between a ground terminal of the temperature sensing element and a control signal input terminal of the second switching element, and configured to sample a short-circuit current when the temperature sensing element and the electric heating element are in contact and are short-circuited, and convert the short-circuit current into a control signal continuously or periodically sent to the second switching element such that the second switching element is continuously or periodically on.

In some embodiments, the short-circuit detection circuit at least includes a second comparator and a filter and rectifier circuit. The second comparator samples the short-circuit current and compares the short-circuit current with a threshold voltage to generate a comparison signal, and the filter and rectifier circuit receives the comparison signal and converts the comparison signal into a control signal sent to the control signal input terminal of the second switching element.

In some embodiments, a reverse input terminal of the second comparator is coupled to the ground terminal of the temperature sensing element via a current limiting resistor and coupled to a low-voltage direct-current power supply via a voltage dividing resistor, a forward input terminal of the second comparator is coupled to power ground, and an output terminal of the second comparator is coupled to the filter and rectifier circuit, and configured with a pull-up resistor coupled to the low-voltage direct-current power supply.

In some embodiments, the filter and rectifier circuit includes a first diode and a second diode connected in series in a same direction, and a filter capacitor with one end coupled between the two diodes and the other end coupled to the power ground. An anode of the first diode is coupled to the output terminal of the second comparator, and a cathode of the second diode is coupled to the control signal input terminal of the second switching element and coupled to the power ground via a grounding resistor.

In some embodiments, the heating control circuit of the present invention further includes a first sampling circuit. The first sampling circuit is coupled to a ground terminal of the electric heating element to collect a voltage of the ground terminal of the electric heating element. The controller is further configured to detect a first open-circuit voltage collected by the first sampling circuit in a case that the first switching element is in an open or off state, if the first open-circuit voltage is at a high level, it is determined that the electric heating element and the first switching element are normal, and if the first open-circuit voltage is at a low level, it is determined that the electric heating element or the first switching element is faulty.

In some embodiments, the heating control circuit of the present invention further includes a second sampling circuit. The second sampling circuit is coupled to a ground terminal of the first switching element to collect a voltage of the ground terminal of the first switching element. The controller is further configured to detect a second open-circuit voltage collected by the second sampling circuit and compares the second open-circuit voltage with a set value when it is detected that the first open-circuit voltage is at the low level in the case that the first switching element is in the open or off state, if the second open-circuit voltage is less than the set value, it is determined that the electric heating element is faulty, and if the second open-circuit voltage is greater than the set value, it is determined that the first switching element is faulty.

In some embodiments, the control signal input terminal of the second switching element is coupled to the controller, and the controller is further configured to control the second switching element to be turned on when it is determined that the first switching element is faulty.

In some embodiments, the first sampling circuit includes at least one current limiting resistor coupled between the ground terminal of the electric heating element and one signal input terminal of the controller, and a clamping circuit configured to protect the controller.

In some embodiments, the second sampling circuit includes a sampling resistor coupled between the ground terminal of the first switching element and the power ground, a current limiting resistor coupled between the ground terminal of the first switching element and one signal input terminal of the controller, and a filter capacitor coupled between the signal input terminal of the controller and the power ground.

In some embodiments, the first switching element and the second switching element are TRIAC or SCR elements.

In some embodiments, the heating control circuit of the present invention further includes a power supply circuit. The power supply circuit is coupled to an external power supply to provide an alternating-current voltage for the electric heating element, and configured with a voltage conversion circuit, and the voltage conversion circuit is configured to convert the alternating-current voltage into a low-voltage direct-current power supply.

In some embodiments, the power supply circuit includes a live wire connection terminal and a neutral wire connection terminal which are configured to be coupled to the external power supply, and an overcurrent fuse and a thermal fuse which are connected in series after the live wire connection terminal, and the power terminal of the electric heating element is coupled to a current output terminal of the thermal fuse.

In some embodiments, the heating control circuit of the present invention further includes a zero-crossing detection circuit. The zero-crossing detection circuit is coupled between the current output terminal of the thermal fuse and one input terminal of the controller, and includes at least one current limiting resistor, a filter capacitor and one clamping and switching diode.

Another aspect of the present invention further discloses an electric blanket, including: a body; an electric heating element, distributed in the blanket body; and the heating control circuit according to the first aspect described above, coupled to the electric heating element and configured to control power on-off of the electric heating element.

In some embodiments, the electric heating element is an electric heating wire arranged in the blanket body, the temperature sensing element is a temperature-sensitive wire arranged in parallel with the electric heating wire, and the electric heating wire and the temperature-sensitive wire are separated by an insulating flexible material.

In some embodiments, the electric heating wire and the temperature-sensitive wire are arranged integrally and include a core, the electric heating wire is spirally wound on the core and externally wrapped with a first insulating layer, and the temperature-sensitive wire is spirally wound on the first insulating layer and externally provided with a second insulating layer wrapping the temperature-sensitive wire.

According to the heating control circuit of the present invention, by arranging the PTC element and the comparison circuit, accurate control on the heating temperature of the electric heating element can be realized. The key element open-circuit or short-circuit detection and protection circuit is further arranged, so that the power can be cut off in time when the local temperature of the electric heating wire is too high or the key elements are open/short-circuited, thereby preventing the occurrence of a fire, and ensuring the life and property safety of the users.

DETAILED DESCRIPTION

In order to further understand the present invention, preferred implementations of the present invention will be described below in conjunction with embodiments. However, it should be understood that these descriptions are made to illustrate the general principles of the present invention and should not be considered as limiting.

It should be noted that the terms "first", "second", and the like in the specification and claims of the present invention and the foregoing drawings are used to distinguish similar objects and do not necessarily describe a specific sequence or order. It should be understood that the data used as such may be interchanged where appropriate so that the embodiments of the present invention described herein can be implemented in an order other than the order illustrated or described herein. In addition, the terms "include", "comprise" and any other variations are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

In the specification and claims of the present invention, "coupled" includes both a direct connection and an indirect connection, such as a connection via an electrically conductive medium (for example, a conductor) which may contain a parasitic inductance or parasitic capacitance, and may further include a connection via other active devices or passive devices on the basis of achieving the same or similar functional purposes, such as a connection via a switching or follower circuit or other circuits or components.

Figure 1:
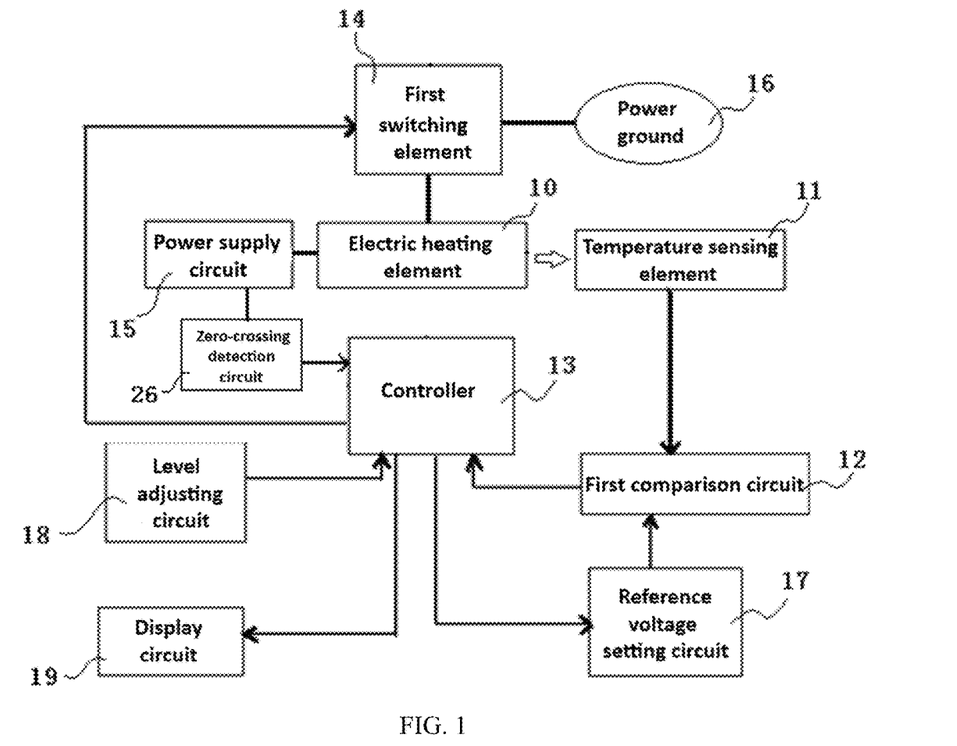
FIG. 1 is a functional block diagram of one example embodiment of a heating control circuit according to the present invention.

FIG. 1 shows a functional block diagram of a heating control circuit according to one example embodiment of the present invention. Referring to FIG. 1, a heating control circuit configured to control power of an electric heating element 10 includes: a temperature sensing element 11, having positive temperature coefficient ("PTC") characteristics and configured to sense a temperature of the electric heating element to generate a temperature voltage; a first comparison circuit 12, configured to compare the temperature voltage with a reference voltage to generate a comparison signal; a controller 13, configured to output an on-off control signal according to the comparison signal; and a first switching element 14, coupled into a ground loop of the electric heating element 10 and configured to switch on or off a power loop of the electric heating element based on the on-off control signal.

Specifically, the electric heating element 10 is made of an electric heating material, and may generate heat after being energized. One end of the electric heating element is coupled to a power supply circuit 15, and the other end of the electric heating element is coupled to power ground 16 via the first switching element 14. Thereby, when the first switching element 14 is switched on or turned on, a current passes through the electric heating element 10 and heat is generated, and when the first switching element 14 is switched off or turned off, no current passes through the electric heating element 10 and heat generation is stopped. The temperature sensing element 11 has PTC characteristics. When the temperature sensed by the temperature sensing element increases, the resistance value increases accordingly. Thereby, when an appropriate voltage is applied across the two ends of the temperature sensing element, a temperature voltage may be generated to embody the change in the resistance value. The temperature voltage reflects the level of the temperature sensed by the temperature sensing element.

In some embodiments, the power supply circuit 15 is configured to be coupled to an external power supply to provide an alternating-current voltage for the electric heating element 10. The power supply circuit is further configured with a voltage conversion circuit to convert the alternating-current voltage into a low-voltage direct-current power supply, thereby providing the low-voltage direct-current power supply for other active or passive devices of the heating control circuit in this example. For the convenience of subsequent description, an illustrative example of the power supply circuit 15 will be shown below first.

Figure 2:
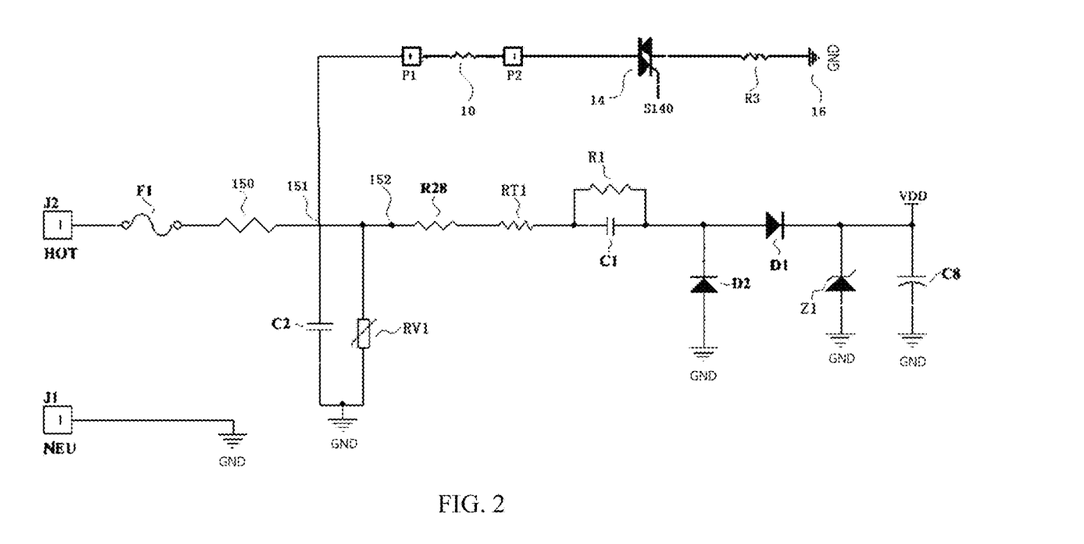
FIG. 2 is a schematic circuit diagram of a power supply circuit, and an electric heating element and a first switching element coupled thereto in one example embodiment of the heating control circuit according to the present invention.

Referring to FIG. 2, in this illustrative example, the power supply circuit includes a live wire connection terminal J2 and a neutral wire connection terminal J1 which are configured to be coupled to the external power supply, and an overcurrent fuse F10 and a thermal fuse 150 which are connected in series after the live wire connection terminal J2. The power terminal P1 of the electric heating element 10 is coupled to a connection point 151 located after the thermal fuse 150. One terminal of the first switching element 14 is coupled to a ground terminal P2 of the electric heating element 10, and the other terminal of the first switching element is coupled to the power ground 16 via a resistor R3. A control signal input terminal of the first switching element 14 is coupled to the controller and configured to receive an on-off control signal S140 from the controller.

In some embodiments, the first switching element 14 may be a TRIAC or a thyristor, which is turned on or off based on the control signal of the control signal input terminal.

In this illustrative example, if a temperature of the thermal fuse 150 exceeds a limit temperature (for example, 102° C.), a blowout will occur, so that the current in the power supply circuit will be cut off. In other embodiments of the present invention, the circuit is protected by using this characteristic, which will be described in detail in the subsequent embodiments.

Referring to FIG. 2, in this illustrative example, the power supply circuit further includes a voltage conversion circuit coupled after the thermal fuse 150. The voltage conversion circuit specifically includes the following sequentially coupled after the thermal fuse 150: a wire-wound resistor R28, a thermally sensitive resistor RT1, a rectifier and filter unit composed of a resistor R1 and a capacitor C1 connected in parallel and diodes D1 and D2, a Zener diode Z1 and a filter capacitor C8, and finally outputs a low-voltage direct-current power supply VDD. The principle of the voltage conversion circuit is well known to those skilled in the art, and will not be described in detail here. In addition, after the thermal fuse 150, a protection circuit composed of a capacitor C2 and a varistor RV1 connected in parallel is further arranged to cope with the overvoltage and overcurrent situations that may occur unexpectedly.

Figure 3:
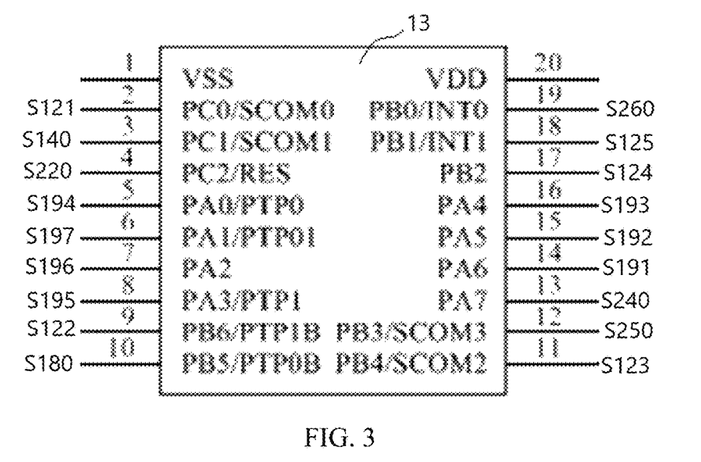
FIG. 3 is a schematic diagram showing pins of a controller in one example embodiment of the heating control circuit according to the present invention.

In some embodiments, the controller 13 may be a CPU, an MCU or other programmable devices. Referring to FIG. 3, in an illustrative example, the controller is a microcontroller unit (MCU) 130, which has a plurality of signal input/output pins (pins 1-20) and may receive signals via the signal input pins and output signals via the corresponding signal output pins based on a configured program. In this illustrative example, the pin 3 (PC1) of the controller 13 is coupled to the control signal input terminal of the first switching element 14 and configured to output the on/off control signal S140.

Figure 4:
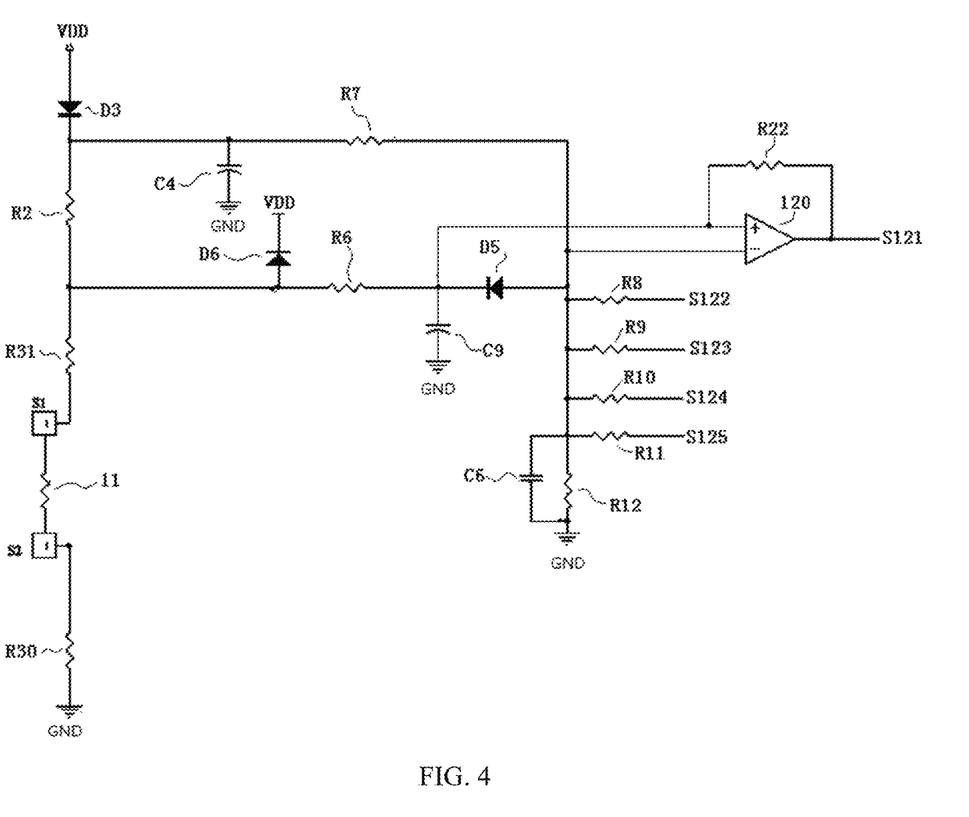
FIG. 4 is a schematic circuit diagram of a first comparison circuit and a reference voltage setting circuit in one example embodiment of the heating control circuit according to the present invention.

Referring to FIG. 4, in some embodiments, the first comparison circuit 12 includes a first comparator 120. A forward input terminal of the first comparator 120 is coupled to a voltage divider circuit composed of resistors R2 and R31 via a resistor R6. The resistors R2 and R31 are coupled in series between the low-voltage direct-current power supply VDD and a power terminal S1 of the temperature sensing element 11, and coupled with a diode D3 at the end close to the low-voltage direct-current power supply VDD. In addition, the loop is further provided with a clamping diode D6 coupled to the low-voltage direct-current power supply VDD, and a filter capacitor C9. A reverse input terminal of the first comparator 120 is configured to receive a reference voltage, and an output terminal of the first comparator is coupled to the pin 2 (PC0) of the controller 13 shown in FIG. 3 to output a comparison signal S121 to the controller 13.

The working principle of the first comparison circuit in this illustrative embodiment is as follows:

When the electric heating element 10 is powered on and starts heating, the temperature sensed by the temperature sensing element 11 increases, so the resistance value increases, the voltage at the power terminal S1 increases, and thereby the temperature voltage sampled by the forward input terminal of the first comparator 120 also increases accordingly. When the voltage detected by the forward input terminal of the first comparator 120 is greater than the reference voltage received by the reverse input terminal, the comparison signal S121 output by the output terminal is at a high level. After the controller 13 receives the high-level comparison signal, the on-off control signal is output to the control signal input terminal of the first switching element 14 through the pin 3 (PC1) to turn off the first switching element 14, thereby cutting off the power loop of the electric heating element 10 and causing the electric heating element to stop heating. After the heating is stopped, as the temperature sensed by the temperature sensing element 11 decreases, the resistance value slowly decreases, so that the temperature voltage sampled by the forward input terminal of the first comparator 120 also decreases accordingly. After the sampled temperature voltage is lower than the reference voltage received by the reverse input terminal, the comparison signal S121 output by the output terminal becomes at a low level. After the controller 13 receives the low-level comparison signal, the on-off control signal is output to the control signal input terminal of the first switching element 14 via the pin 3 (PC1) to turn on the first switching element 14, thereby switching on the power loop of the electric heating element 10 and causing the electric heating element to restore heating. During the heating, the two processes are carried out alternately and achieve the purpose of constant temperature by cycle control.

In addition, if the temperature sensing element 11 is open-circuited due to a fault, the voltage detected by the forward input terminal of the first comparator 120 is always greater than the reference voltage received by the reverse input terminal, and at this time, the output terminal of the first comparator 120 continuously outputs a high level. After the controller 13 receives the continuous high-level comparison signal, it is determined that the temperature sensing element 11 is (open-circuited) faulty.

Referring to FIG. 1, in some embodiments, the heating control circuit of the present invention further includes a reference voltage setting circuit 17, which is coupled to at least one signal output terminal of the controller 13 and the reverse input terminal of the first comparator 120, and configured to adjust the reference voltage received by the first comparison circuit 12 based on a setting signal of the controller 13.

Referring to FIG. 4, in an illustrative example, the reference voltage setting circuit includes resistors R7 and R12 coupled in series between the low-voltage direct-current power supply VDD and the power ground, and a capacitor C6 connected in parallel with the resistor R12. The reverse input terminal of the first comparator 120 is coupled between the resistors R7 and R12, and respectively connected to the pin 9 (PB6), the pin 11 (PB4), the pin 17 (PB2) and the pin 18 (PB1) of the controller 13 through resistors R8, R9, R10 and R11. Thereby, when the above one or several pins of the controller 13 are turned on, the resistors R8, R9, R10 and R11 can be connected into the voltage divider circuit composed of the resistors R7 and R12 to respectively generate adjusting signals S122, S123, S124 and S125, thereby adjusting the reference voltage received by the reverse input terminal of the first comparator 120. In a further preferred solution, a front end of the resistor R7 is further provided with a filter capacitor C4, and a diode D5 is coupled between the reverse input terminal and the forward input terminal of the first comparator 120 to protect the first comparator 120.

Referring to FIG. 1, in some embodiments, the heating control circuit of the present invention further includes a level adjusting circuit 18, which is coupled to one signal input terminal of the controller 13 and configured to generate a level adjusting signal. Accordingly, the controller 13 is further configured to output the setting signal based on the level adjusting signal to adjust the reference voltage received by the first comparison circuit 12.

In an illustrative embodiment, the level adjusting circuit is an electric switch coupled to the pin 10 (PB5) of the controller 13, and the other end of the electric switch is grounded. When the electric switch is turned on, a corresponding level change signal S180 may be generated at the pin 10 (PB5) of the controller 13, so that the controller 13 may generate the adjusting signal via the pin 9 (PB6), the pin 11 (PB4), the pin 17 (PB2) and the pin 18 (PB1) based on a preset program according to the level change signal, thereby adjusting the reference voltage received by the reverse input terminal of the first comparator 120.

Referring to FIG. 1, in some embodiments, the heating control circuit of the present invention further includes a display circuit 19, which is coupled to at least one signal output terminal of the controller 13 and configured to display a current setting level or a fault signal based on a display control signal output by the controller 13.

Figure 5:
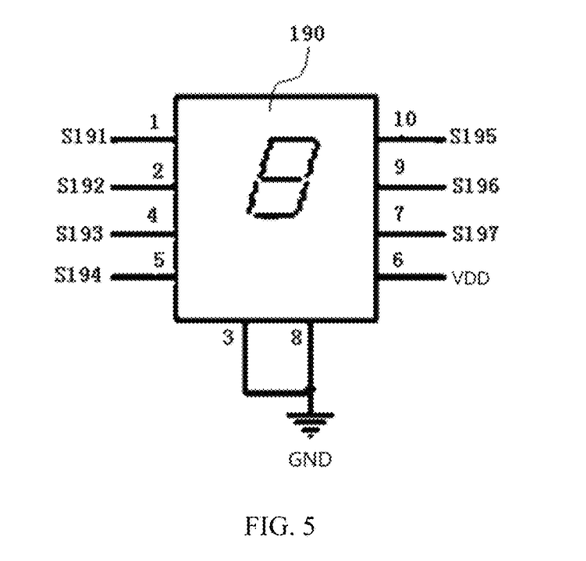
FIG. 5 is a schematic diagram of a display circuit in one example embodiment of the heating control circuit according to the present invention.

Referring to FIG. 5, in an illustrative embodiment, the display circuit 19 includes an LED nixie tube 190, whose pins 1, 2, 4, 5, 7, 9 and 10 are respectively coupled to the pin 14 (PA6), the pin 15 (PA5), the pin 16 (PA4), the pin 5 (PA0), the pin 8 (PA3), pin 7 (PA2) and pin 6 (PA1) of the controller 13. The pin 6 is coupled to the low-voltage direct-current power supply VDD, and the pins 3 and 8 are grounded, so that the display control signals S191-S197 output by the controller may be received to display the current setting level or fault signal.

Figure 6:
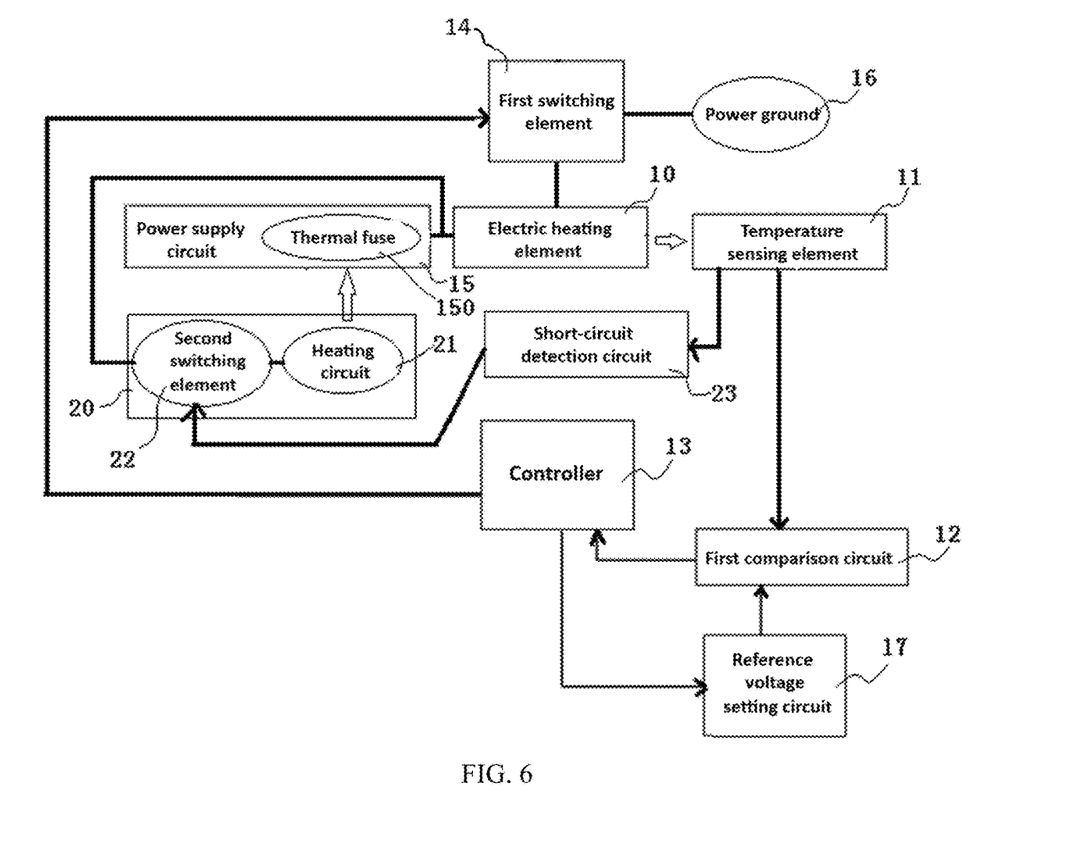
FIG. 6 is a functional block diagram of another example embodiment of a heating control circuit according to the present invention.

FIG. 6 shows a functional block diagram of a heating control circuit according to another example embodiment of the present invention. Referring to FIG. 6, a heating control circuit configured to control power of an electric heating element 10 includes: a temperature sensing element 11, having PTC characteristics and configured to sense a temperature of the electric heating element to generate a temperature voltage; a first comparison circuit 12, configured to compare the temperature voltage with a reference voltage to generate a comparison signal; a controller 13, configured to output an on-off control signal according to the comparison signal; a first switching element 14, coupled into a ground loop of the electric heating element 10 and configured to switch on or off a power loop of the electric heating element based on the on-off control signal; a fuse protection circuit 20, including a heating circuit 21, a second switching element 22, and a thermal fuse 150 coupled into the power loop 15 of the electric heating element 10, the heating circuit 21 being configured to generate heat to blow out the thermal fuse 150 when the second switching element 22 is turned on; and a short-circuit detection circuit 23, coupled between a ground terminal of the temperature sensing element 11 and a control signal input terminal of the second switching element 22, and configured to sample a short-circuit current when the temperature sensing element 11 and the electric heating element 10 are in contact and are short-circuited, and convert the short-circuit current into a control signal continuously or periodically sent to the second switching element 22, such that the second switching element 22 is continuously or periodically on, and thereby, the heating circuit 21 is energized to generate heat to blow out the thermal fuse 150.

Compared with the above embodiment, the heating control circuit in this example embodiment is additionally provided with the fuse protection circuit 20 and the short-circuit detection circuit 23. The working principle of heating control is similar to that of the above embodiment, and will not be described in detail. Only the fuse protection circuit 20 and the short-circuit detection circuit 23 will be further described below in conjunction with the illustrative embodiments thereof.

Figure 7:
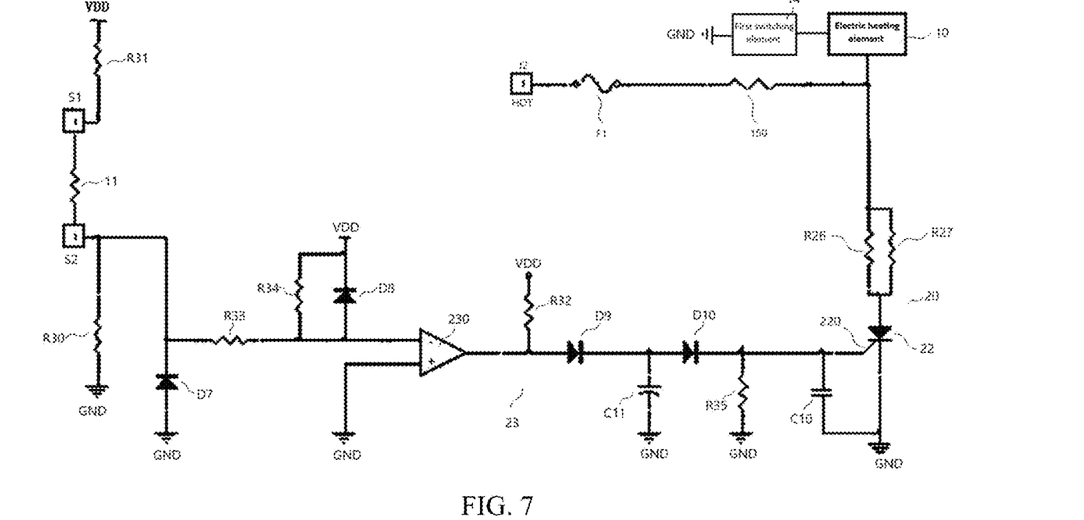
FIG. 7 is a schematic circuit diagram of a fuse protection circuit and a short-circuit detection circuit in one example embodiment of the heating control circuit according to the present invention.

Referring to FIG. 7, in an illustrative embodiment, the heating circuit 21 includes two thermistors R26 and R27 connected in parallel. One end of the two thermistors R26 and R27 is coupled to a current output terminal of the thermal fuse 150, and the other end of the two thermistors is grounded via the second switching element 22. It should be noted that in FIG. 7, for the sake of clarity, the thermal fuse 150 and the two thermistors R26 and R27 are shown separately. In actual installation, the thermal fuse 150 is installed between the two thermistors R26 and R27. Thereby, when the two thermistors R26 and R27 are energized to generate heat, the thermal fuse 150 may be heated, and when the temperature of the thermal fuse 150 reaches a blowout point (for example, 102° C.), a blowout may occur, thereby cutting off the power supply of the electric heating element and the two thermistors R26 and R27.

Referring to FIG. 7, in an illustrative embodiment, the short-circuit detection circuit 23 at least includes a second comparator 230 and a filter and rectifier circuit coupled to an output terminal of the second comparator. A reverse input terminal of the second comparator 230 is coupled to the ground terminal S2 of the temperature sensing element 11 via a current limiting resistor R33 and coupled to a low-voltage direct-current power supply via a voltage dividing resistor R34. In addition, the reverse input terminal of the second comparator is further coupled to a low-voltage direct-current power supply VDD and power ground respectively via a diode D8 and a diode D7 to constitute a clamping circuit, thereby protecting the second comparator 230. A forward input terminal of the second comparator 230 is coupled to the power ground. An output terminal of the second comparator 230 is coupled to a filter and rectifier circuit, and configured with a pull-up resistor R32 coupled to the low-voltage direct-current power supply VDD. The filter and rectifier circuit includes a first diode D9 and a second diode D10 connected in series in a same direction, and a filter capacitor C11 with one end coupled between the two diodes and the other end coupled to the power ground. An anode of the first diode D9 is coupled to the output terminal of the second comparator 230, and a cathode of the second diode D10 is coupled to the control signal input terminal 220 of the second switching element 22 and coupled to the power ground via a grounding resistor R35.

In an illustrative embodiment, the second switching element 22 is a silicon controlled switch (SCR), and a capacitor C10 is arranged between the control signal input terminal and the ground terminal thereof.

The working principle of the heating control circuit in this embodiment will be further described below in conjunction with the above illustrative embodiments.

When the temperature sensing element 11 works normally, the resistors R33 and R34, and the resistor R30 coupled between the ground terminal S2 of the temperature sensing element 11 and the power ground constitute the voltage divider circuit, which provides a voltage for the reverse input terminal of the second comparator 230. At this time, the voltage of the reverse input terminal of the second comparator 230 is higher than that of the forward input terminal, the output terminal outputs a low level, and the second switching element 22 is not on.

When the temperature sensing element 11 and the heating element 10 are short-circuited, the alternating-current voltage after the short-circuiting is applied to the reverse input terminal of the second comparator 230 via the ground terminal S2 of the temperature sensing element 11. At this time, the output terminal of the second comparator 230 outputs a series of pulses, which are rectified by the filter and rectifier circuit (the diode D9 and the capacitor C11) and applied to the control signal input terminal 220 of the second switching element 22, so that the second switching element 22 is turned on, and thereby, the two thermistors R26 and R27 start to be energized and generate heat. When the thermal fuse 150 arranged between the two thermistors R26 and R27 senses a temperature of about 102° C., a blowout occurs, so that the power supply of the electric heating element and the two thermistors R26 and R27 is cut off, thereby achieving the purpose of protection.

Figure 8:
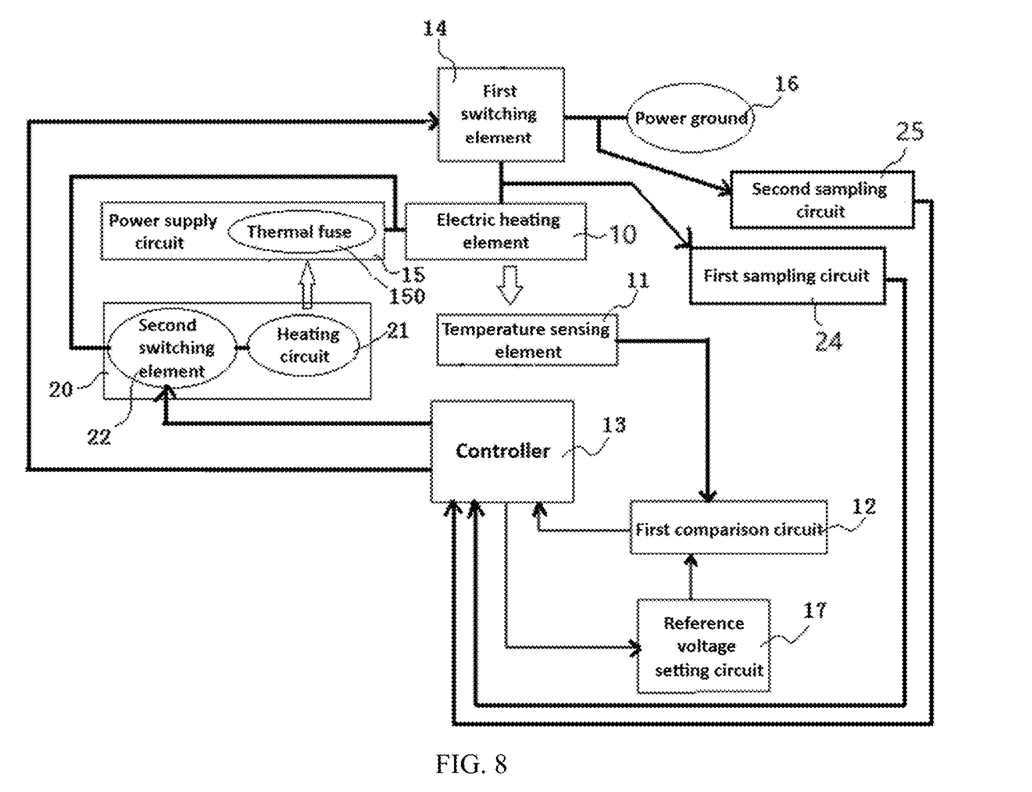
FIG. 8 is a functional block diagram of another example embodiment of a heating control circuit according to the present invention.

FIG. 8 shows a functional block diagram of a heating control circuit according to another example embodiment of the present invention. Referring to FIG. 8, a heating control circuit configured to control power of an electric heating element 10 includes: a temperature sensing element 11, having PTC characteristics and configured to sense a temperature of the electric heating element 10 to generate a temperature voltage; a first comparison circuit 12, configured to compare the temperature voltage with a reference voltage to generate a comparison signal; a controller 13, configured to output an on-off control signal according to the comparison signal; a first switching element 14, coupled into a ground loop of the electric heating element 10 and configured to switch on or off a power loop of the electric heating element based on the on-off control signal; a first sampling circuit 24, coupled to a ground terminal of the electric heating element 10 to collect a voltage of the ground terminal of the electric heating element; and a second sampling circuit 25, coupled to a ground terminal of the first switching element 14 to collect a voltage of the ground terminal of the first switching element.

In this example embodiment, the controller 13 is further configured to detect a first open-circuit voltage collected by the first sampling circuit 24 in a case that the first switching element 14 is in an open or off state. If the first open-circuit voltage is at a high level, it is determined that the electric heating element 10 and the first switching element 14 are in a normal state, and if the first open-circuit voltage is at a low level, it is determined that the electric heating element 10 or the first switching element 14 is faulty.

As a further preferred solution, the controller 13 is further configured to detect a second open-circuit voltage collected by the second sampling circuit 25 and compares the second open-circuit voltage with a set value when it is detected that the first open-circuit voltage is at the low level in the case that the first switching element 14 is in the open or off state. If the second open-circuit voltage is less than the set value, it is determined that the electric heating element 10 is faulty (open-circuited), and if the second open-circuit voltage is greater than the set value, it is determined that the first switching element 14 is faulty (short-circuited).

As a further preferred solution, the heating control circuit in this example embodiment further includes a fuse protection circuit 20 shown in the above embodiment, which includes a heating circuit 21, a second switching element 22, and a thermal fuse 150 coupled into the power loop 15 of the electric heating element 10 (with reference to the above embodiment). The heating circuit 21 is configured to generate heat when the second switching element 22 is turned on so as to blow out the thermal fuse 150. The control signal input terminal of the second switching element 20 is coupled to one signal output terminal of the controller 13, specifically the pin 4 (PC2) of the controller 13. The controller 13 is further configured to output a control signal S220 to control the second switching element 22 to be turned on when it is determined that the first switching element 14 is faulty (short-circuited), so that the two thermistors R26 and R27 start to be energized and generate heat, thereby blowing out the thermal fuse 150 arranged between the two thermistors R26 and R27.

Figure 9:
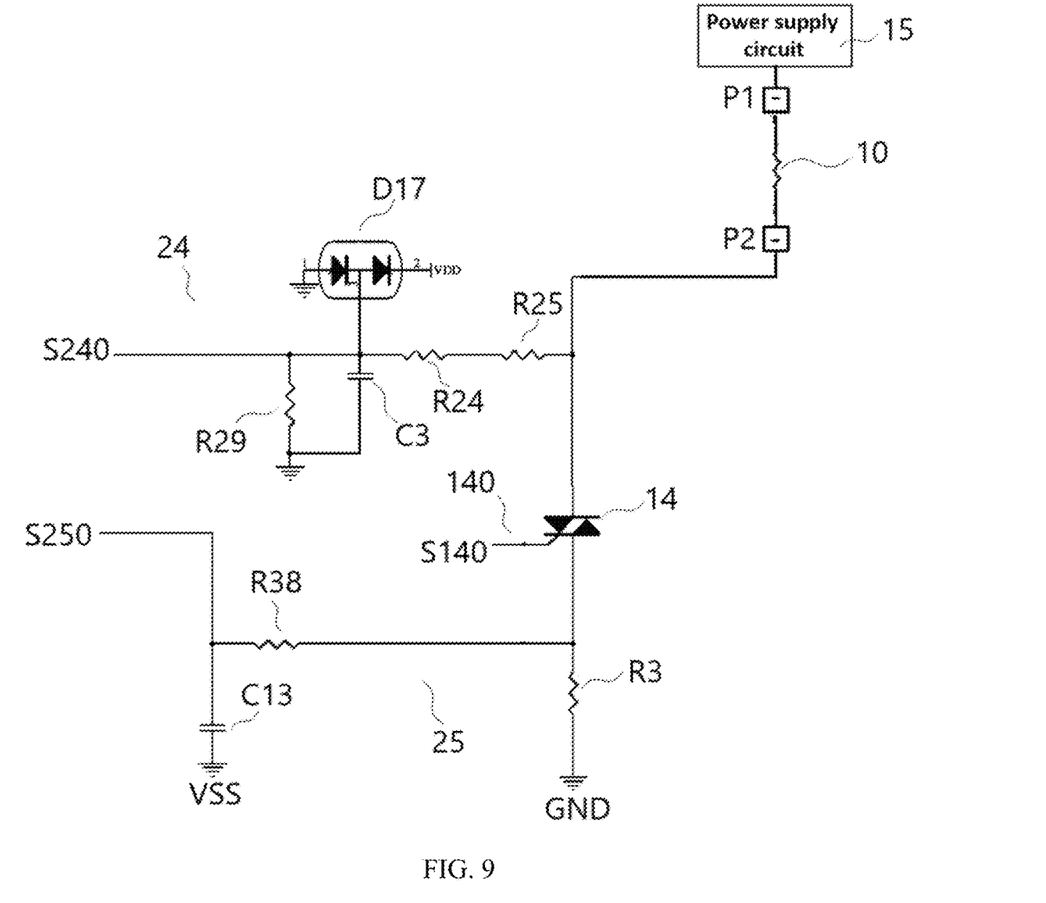
FIG. 9 is a schematic circuit diagram of a first sampling circuit and a second sampling circuit in one example embodiment of the heating control circuit according to the present invention.

Referring to FIG. 9, in an illustrative embodiment, the first sampling circuit 24 includes current limiting resistors R25 and R24 coupled between the ground terminal P2 of the electric heating element 10 and the pin 13 (PA7) of the controller 13, and a capacitor C3 and a resistor R29 connected in parallel and grounded. One end of the pin 13 (PA7) of the controller 13 is further coupled to a clamping circuit configured to protect the controller, which includes a clamping and switching diode D17.

Referring to FIG. 9, in an illustrative embodiment, the second sampling circuit 25 includes a sampling resistor R3 coupled between the ground terminal of the first switching element 14 and the power ground, a current limiting resistor R38 coupled between the ground terminal of the first switching element 14 and the pin 12 (COM3) of the controller 13, and a filter capacitor C13 coupled between the pin 12 (COM3) of the controller 13 and the power ground.

The working principle of the heating control circuit in this embodiment will be further described below in conjunction with the above illustrative embodiments.

When the electric heating element 10 works, the first sampling circuit 24 samples the voltage of the ground terminal P2 of the electric heating element 10 via the resistors R25, R24 and R29 and the capacitor C13. When the control signal S140 of the controller received by the control signal input terminal 140 of the first switching element 14 is off, the first sampling circuit 24 samples a first open-circuit voltage signal S240, and the controller 13 determines the state of the electric heating element 10 and the first switching element 14 based on the first open-circuit voltage signal S240. If the first open-circuit voltage signal S240 is at a high level, it is determined that the electric heating element 10 and the first switching element 14 are in a normal state, and if the first open-circuit voltage signal S240 is at a low level, it is determined that the electric heating element 10 or the first switching element 14 is faulty. At this time, a further determination is made according to the second open-circuit voltage signal S250 received by the controller and sampled by the second sampling circuit 25. If the second open-circuit voltage signal S250 is less than a set value, it is determined that the electric heating element 10 is faulty. Usually, the electric heating element 10 is open-circuited, causing the ground terminal P2 to be at the low level. If the second open-circuit voltage signal S250 is greater than the set value, it is determined that the first switching element 14 is faulty. Usually, the first switching element 14 fails and is short-circuited, causing a voltage generated at the ground terminal. The set value may be set according to actual situations. When the controller determines that the first switching element 14 is faulty (fails and is short-circuited), the second switching element 22 is controlled to be turned on via the control signal S220 output by the pin 4 (PC2), so that the two thermistors R26 and R27 start to be energized and generate heat, so as to blow out the thermal fuse 150 arranged between the two thermistors R26 and R27, thereby cutting off the power of the electric heating element 10 and achieving the purpose of protection.

Referring to FIG. 1, in some embodiments, the heating control circuit of the present invention further includes a zero-crossing detection circuit, which is coupled between the current output terminal of the thermal fuse 150 and one input terminal of the controller and configured to sample a zero-crossing signal of the power supply.

Figure 10:
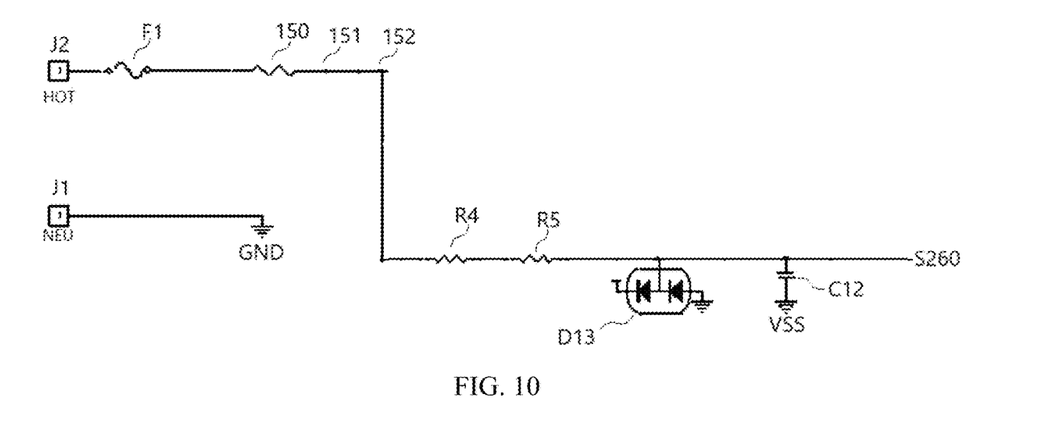
FIG. 10 is a schematic circuit diagram of a zero-crossing detection circuit in one example embodiment of the heating control circuit according to the present invention.

Referring to FIG. 10, in an illustrative embodiment, the zero-crossing detection circuit includes two current limiting resistors R4 and R5 and a filter capacitor C12 that are coupled between a connection point 152 after the current output terminal of the thermal fuse 150 and the pin 19 (PB0) of the controller 13, and one clamping and switching diode D13 (for protecting the controller). Based on a detection signal S260 sampled by the zero-crossing detection circuit, the controller 13 may detect a zero-crossing abnormality of the power supply, and take a corresponding protection action (for example, cutting off the first switching element).

Figure 11:
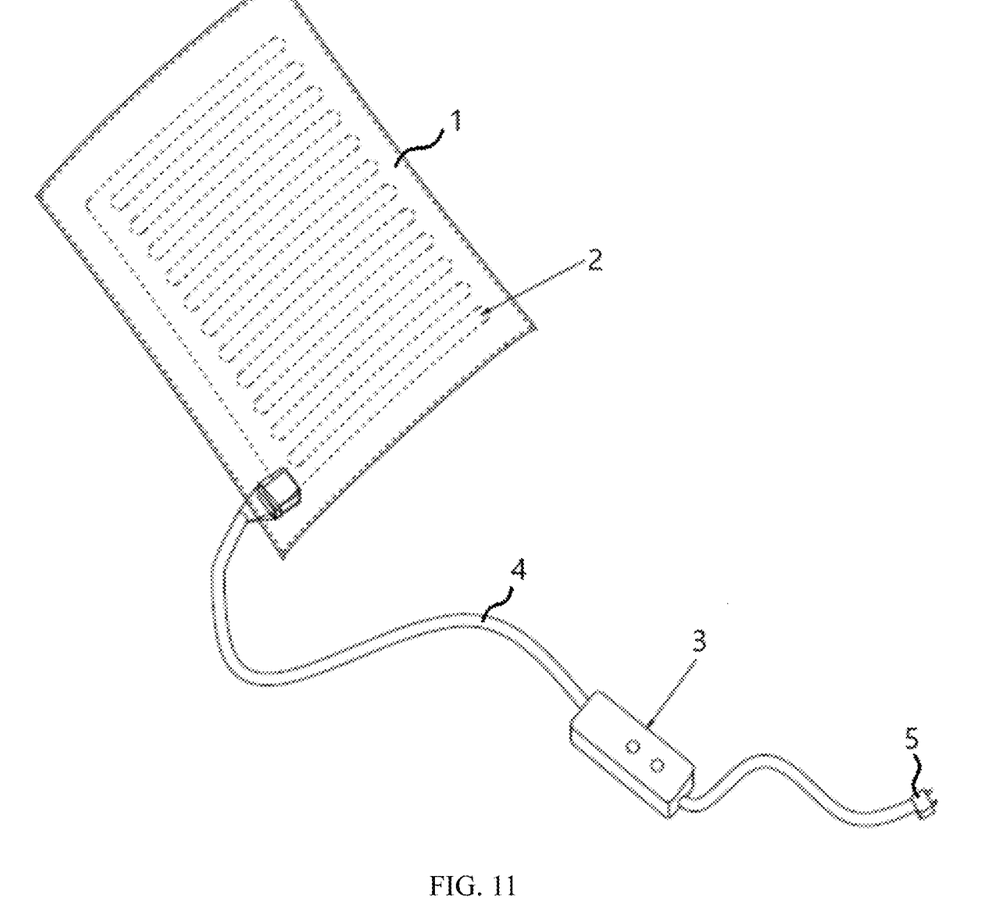
FIG. 11 is a schematic diagram of one example embodiment of an electric blanket configured with the heating control circuit according to the present invention.

FIG. 11 shows another example embodiment of the present invention, which is an electric blanket configured with the heating control circuit in the above one or several embodiments. The electric blanket includes:

a blanket body 1; an electric heating line 2, distributed in the blanket body; and the heating control circuit shown in the above one or several embodiments, which is mainly configured in a control module 3, takes electricity via a plug 5, is coupled to the electric heating line 2 via a wire 4 and is configured to control power on-off of the electric heating line 2.

In some embodiments, the electric heating line 2 includes an electric heating wire arranged in the blanket body 1, and a temperature-sensitive wire arranged in parallel with the electric heating wire, and the electric heating wire and the temperature-sensitive wire are separated by an insulating flexible material.

Figure 12:
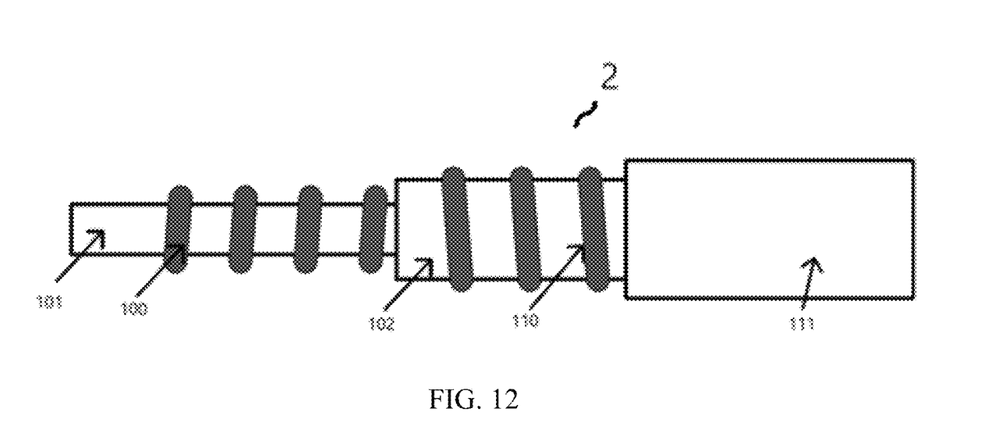
FIG. 12 is a schematic structural diagram of an electric heating wire and a temperature-sensitive wire arranged integrally in one example embodiment of the electric blanket configured with the heating control circuit according to the present invention.

Referring to FIG. 12, in an illustrative embodiment, the electric heating wire and the temperature-sensitive wire are arranged integrally. The electric heating wire 100 is spirally wound on a core 101 and externally wrapped with a first insulating layer 102. The temperature-sensitive wire 110 is spirally wound on the first insulating layer 102 and externally provided with a second insulating layer 111 wrapping the temperature-sensitive wire 110. Optionally, the core 101 is a polyester thread. The first insulating layer 102 and the second insulating layer 111 are made of a polyvinyl chloride (PVC) mixture, and a melting point of the first insulating layer 102 is set to be lower than that of the second insulating layer 111. Thereby, when the local temperature is too high, the first insulating layer 102 is firstly blown out to short-circuit the electric heating wire 100 and the temperature-sensitive wire 110, so that the thermal fuse is blown out by the heating control circuit in the above embodiment to cut off the power supply.

It should be noted that, in some embodiments, the electric blanket of the present invention can be configured with a certain heating control circuit shown in the above embodiments, or comprehensively configured with several heating control circuits shown in the above embodiments, so as to achieve a purpose of better protection and achieve better safety. The implementation manners of several heating control circuits and working principles thereof have been described in detail in the above embodiments, and therefore, will not be described again.

The descriptions in the above embodiments are merely used to facilitate to understand the method of the present invention and the core idea thereof. It should be pointed out that those of ordinary skill in the art may also make several improvements and modifications on the present invention without departing from the principle of the present invention, these improvements and modifications also falling within the scope of protection of the claims of the present invention.

The invention claimed is:

1. A heating control circuit configured to control power of an electric heating element, comprising:
a temperature sensing element, having positive temperature coefficient characteristics and configured to sense a temperature of the electric heating element to generate a temperature voltage;
a first comparison circuit, configured to compare the temperature voltage with a reference voltage to generate a comparison signal;
a controller, configured to output an on-off control signal according to the comparison signal; and
a first switching element, coupled into a ground loop of the electric heating element and configured to switch on or off a power loop of the electric heating element based on the on-off control signal.

2. The heating control circuit according to claim 1, wherein the first comparison circuit at least comprises a first comparator, a forward input terminal of the first comparator being coupled to a power terminal of the temperature sensing element via a voltage divider circuit, a reverse input terminal of the first comparator being configured to receive the reference voltage, and an output terminal of the first comparator being coupled to one signal input terminal of the controller.

3. The heating control circuit according to claim 2, further comprising a reference voltage setting circuit, wherein the reference voltage setting circuit is coupled to at least one signal output terminal of the controller and the reverse input terminal of the first comparator, and configured to adjust the reference voltage received by the first comparison circuit based on a setting signal of the controller.

4. The heating control circuit according to claim 3, further comprising a level adjusting circuit, wherein the level adjusting circuit is coupled to one signal input terminal of the controller and configured to generate a level adjusting signal, and the controller is further configured to output the setting signal based on the level adjusting signal to adjust the reference voltage received by the first comparison circuit.

5. The heating control circuit according to claim 4, further comprising a display circuit, wherein the display circuit is coupled to at least one signal output terminal of the controller, and configured to display a current setting level or a fault signal based on a display control signal output by the controller.

6. The heating control circuit according to claim 5, further comprising a fuse protection circuit, wherein the fuse protection circuit comprises a heating circuit, a second switching element, and a thermal fuse coupled into the power loop of the electric heating element, the heating circuit being configured to generate heat when the second switching element is turned on so as to blow out the thermal fuse.

7. The heating control circuit according to claim 6, wherein the heating circuit comprises two thermistors connected in parallel, one end of the two thermistors being coupled to a current output terminal of the thermal fuse, and the other end of the two thermistors being grounded via the second switching element; and the thermal fuse is installed between the two thermistors.

8. The heating control circuit according to claim 6, further comprising a short-circuit detection circuit, wherein the short-circuit detection circuit is coupled between a ground terminal of the temperature sensing element and a control signal input terminal of the second switching element, and configured to sample a short-circuit current when the temperature sensing element and the electric heating element are in contact and are short-circuited, and convert the short-circuit current into a control signal continuously or periodically sent to the second switching element such that the second switching element is continuously or periodically on.

9. The heating control circuit according to claim 8, wherein the short-circuit detection circuit at least comprises a second comparator and a filter and rectifier circuit, the second comparator sampling the short-circuit current and comparing the short-circuit current with a threshold voltage to generate a comparison signal, and the filter and rectifier circuit receiving the comparison signal and converting the comparison signal into a control signal sent to the control signal input terminal of the second switching element.

10. The heating control circuit according to claim 9, wherein a reverse input terminal of the second comparator is coupled to the ground terminal of the temperature sensing element via a current limiting resistor and coupled to a low-voltage direct-current power supply via a voltage dividing resistor, a forward input terminal of the second comparator is coupled to power ground, and an output terminal of the second comparator is coupled to the filter and rectifier circuit, and configured with a pull-up resistor coupled to the low-voltage direct-current power supply.

11. The heating control circuit according to claim 10, wherein the filter and rectifier circuit comprises a first diode and a second diode connected in series in a same direction, and a filter capacitor with one end coupled between the two diodes and the other end coupled to the power ground, wherein an anode of the first diode is coupled to the output terminal of the second comparator, and a cathode of the second diode is coupled to the control signal input terminal of the second switching element and coupled to the power ground via a grounding resistor.

12. The heating control circuit according to claim 6, further comprising a first sampling circuit, wherein the first sampling circuit is coupled to a ground terminal of the electric heating element to collect a voltage of the ground terminal of the electric heating element; and the controller is further configured to detect a first open-circuit voltage collected by the first sampling circuit in a case that the first switching element is in an open or off state, if the first open-circuit voltage is at a high level, it is determined that the electric heating element and the first switching element are normal, and if the first open-circuit voltage is at a low level, it is determined that the electric heating element or the first switching element is faulty.

13. The heating control circuit according to claim 12, wherein the first sampling circuit comprises at least one current limiting resistor coupled between the ground terminal of the electric heating element and one signal input terminal of the controller, and a clamping circuit configured to protect the controller.

14. The heating control circuit according to claim 12, further comprising a second sampling circuit, wherein the second sampling circuit is coupled to a ground terminal of the first switching element to collect a voltage of the ground terminal of the first switching element; and the controller is further configured to detect a second open-circuit voltage collected by the second sampling circuit and compares the second open-circuit voltage with a set value when it is detected that the first open-circuit voltage is at the low level in the case that the first switching element is in the open or off state, if the second open-circuit voltage is less than the set value, it is determined that the electric heating element is faulty, and if the second open-circuit voltage is greater than the set value, it is determined that the first switching element is faulty.

15. The heating control circuit according to claim 14, wherein the control signal input terminal of the second switching element is coupled to the controller, and the controller is further configured to control the second switching element to be turned on when it is determined that the first switching element is faulty.

16. The heating control circuit according to claim 14, wherein the second sampling circuit comprises a sampling resistor coupled between the ground terminal of the first switching element and the power ground, a current limiting resistor coupled between the ground terminal of the first switching element and one signal input terminal of the controller, and a filter capacitor coupled between the signal input terminal of the controller and the power ground.

17. The heating control circuit according to claim 6, wherein the first switching element and the second switching element are TRIAC or SCR elements.

18. The heating control circuit according to claim 6, further comprising a power supply circuit, wherein the power supply circuit is coupled to an external power supply to provide an alternating-current voltage for the electric heating element, and configured with a voltage conversion circuit, and the voltage conversion circuit is configured to convert the alternating-current voltage into a low-voltage direct-current power supply.

19. The heating control circuit according to claim 18, wherein the power supply circuit comprises a live wire connection terminal and a neutral wire connection terminal which are configured to be coupled to the external power supply, and an overcurrent fuse and a thermal fuse which are connected in series after the live wire connection terminal, and the power terminal of the electric heating element is coupled to a current output terminal of the thermal fuse.

20. The heating control circuit according to claim 19, further comprising a zero-crossing detection circuit, wherein the zero-crossing detection circuit is coupled between the current output terminal of the thermal fuse and one input terminal of the controller, and comprises at least one current limiting resistor, a filter capacitor and one clamping and switching diode.

* * * * *